US006947547B2

(12) United States Patent
Cheung et al.

(10) Patent No.: US 6,947,547 B2
(45) Date of Patent: Sep. 20, 2005

(54) MANAGEMENT SYSTEM FOR A TELECOMMUNICATIONS SWITCH

(75) Inventors: Derek C. L. Cheung, Kanata (CA); Carson K. M. Cheung, Kanata (CA); Mircea Trifan, Ottawa (CA)

(73) Assignee: Nortel Networks, Ltd., St. Laurent (CA)

( * ) Notice: Subject to any disclaimer, the term of this patent is extended or adjusted under 35 U.S.C. 154(b) by 899 days.

(21) Appl. No.: 09/817,796

(22) Filed: Mar. 27, 2001

(65) Prior Publication Data

US 2002/0172348 A1 Nov. 21, 2002

(51) Int. Cl.[7] .................................................. H04L 1/00

(52) U.S. Cl. .............................. 379/399.01; 370/236.2; 370/241.1; 379/242; 379/221.06; 379/221.07

(58) Field of Search ........................... 370/236.2, 241.1; 379/243, 220, 221.07, 221.06

(56) References Cited

U.S. PATENT DOCUMENTS 5,590,176 A * 12/1996 Agarwal et al. ....... 379/221.01
5,784,617 A * 7/1998 Greenstein et al. ......... 718/104
6,041,117 A * 3/2000 Androski et al. ........... 379/268
6,226,293 B1 * 5/2001 Sakayori .................. 370/236.2
6,724,728 B1 * 4/2004 Manchester et al. ..... 370/236.2

* cited by examiner

*Primary Examiner*—Sinh Tran
*Assistant Examiner*—Walter F Briney, III
(74) *Attorney, Agent, or Firm*—John C. Gorecki, Esq.

(57) ABSTRACT

A management system for telecommunication switch is described. The management system is useful for providing operations, administration and maintenance (OAM) functions in a terabit switch. The management system is a scalable management system, whereby processing of large amounts of network management traffic from carrier operators and virtual private network (VPN) customers in a terabit switch is enabled. The management system is efficiently implemented by utilizing surplus processing resources in the network interface cards of the switch. The management system includes a protocol unit residing on a first processor card of the switch for receiving a management request, a first request unit residing on the first processor card for creating a request object in response to the received management request, and a first action unit residing on a first network interface card of the switch for executing the received management request in response to an instruction from the request object.

19 Claims, 3 Drawing Sheets

MANAGEMENT SYSTEM FOR A TELECOMMUNICATIONS SWITCH

FIELD OF THE INVENTION

The present invention is related to management systems for telecommunication switches, for example systems providing operations, administration and maintenance (OAM) functions, hereinafter referred to as OAM systems.

BACKGROUND OF THE INVENTION

Presently, routers and switches with switching capability in the ranges of 50 to 200 gigabit per second are used as the core network routing and switching elements in the backbone of a carrier and the Internet. With the explosive growth of data and Internet traffic, carriers are evaluating a new class of routers and switches that have terabit switching capability in order to satisfy the bandwidth demands from users.

Switches in this new class of terabit switches are very different from current gigabit switches in many aspects such as the number of manageable resources and software scalability, among others. These differences make the monolithic OAM design in current gigabit switches less suited to handle the large amount of network management traffic from operators and Virtual Private Networking (VPN) customers in a terabit switching environment.

For example, in a two terabit switch with 200 network interface cards (NICs), each NIC having 10 Gbits aggregated throughput (e.g., 1 port OC192 or 4 ports OC48 card), the switch could have up to 600 physical ports depending on the configuration of the switch. For a contemporary switch that supports the management of logic interfaces defined in Internet Engineering Task Force (IETF) RFC 2863, the total number of logical and physical interfaces increases substantially to a few thousands. On average, each interface manages a dozen of Management Information Base (MIB) variables, such as the ingress and egress counters of an interface, making the total number of manageable MIB variables for the interface related MIB groups alone to a few hundred thousands. Other MIB groups such as the Open Shortest Path First (OSPF), Multi-Protocol Label Switching (MPLS), and sparing systems all have their own MIB variables, which add to the total number of MIB variables requiring management by the switch's OAM system.

The large number of manageable MIB variables in a terabit switch imposes a scalability challenge on the OAM system. This challenge is increased when many operators try to manage the switch by executing "get" and "set" commands on the MIB variables. Furthermore, envisioned VPN services will allow customers to manage their portion of the switch for Service Level Agreement (SLA) compliance, thereby further increasing the amount of network management traffic in the switch and hence making more demands on its OAM system.

It is unlikely that current monolithic OAM systems will be able to meet the network management traffic requirements of terabit switches as outlined above, and hence a new type of management system for a terabit switch is desired.

SUMMARY OF THE INVENTION

It is an object of the present invention to provide an improved management system for a telecommunications switch.

The invention is directed to a scalable management system for a terabit switch, whereby processing of large amounts of network management traffic from carrier operators and VPN customers in the terabit switch is provided. By utilizing surplus processing resources in the network interface cards of the switch the management system reduces the production cost of a terabit switch as compared to a monolithic management system with a dedicated processor. Embodiments of the invention have multiple instances of functional units comprising the embodiment, thereby providing a level of protection against failures which offers an additional advantage of increased reliability over current monolithic management systems.

According to an aspect of the present invention there is provided a management system for a telecommunications switch having a first network interface card and a first processor card. The management system includes a protocol unit residing on the first processor card for receiving a management request, a first request unit residing on the first processor card for creating a first request object in response to the received management request, and a first action unit residing on the first network interface card for executing the received management request in response to an instruction from the first request object.

Conveniently, where the telecommunications switch has a second processor card, the management system further includes a second request unit residing on the second processor card for creating a second request object in response to the received management request. The protocol unit includes a first resource broker for receiving utilization information on the first and second processor cards from the first and second request units and is operable to select, in dependence upon the utilization information, one of the request units to which to send the received management request.

Conveniently, where the telecommunications switch has a second network interface card, the management system further includes a second action unit residing on the second network interface card for executing the received management request in response to an instruction from the first request object. The first request unit includes a second resource broker for receiving utilization information on the first and second network interface cards from the first and second action units and is operable to select, in dependence upon the utilization information, one of the action units to which to send the instruction.

According to another aspect of the present invention there is provided a management system for a telecommunications switch having a distributed computing infrastructure and a plurality of network interface cards and processor cards. The management system includes a protocol unit residing on a first processor card for receiving a management request, a first request unit residing on a second processor card for creating a first request object in response to the received management request, and a first action unit residing on a first network interface card for executing the received management request in response to an execute instruction from the first request object.

Conveniently, the management system further includes a second request unit residing on a third processor card for creating a second request object in response to the received management request. The protocol unit includes a first resource broker for receiving information on utilization of the second and third processor cards from the distributed computing infrastructure and is operable to select, in dependence upon the processor card utilization information, one of the request units to which to send the received management request.

Conveniently, the management system further includes a second action unit residing on a second network interface card for executing the received management request in response to an execute instruction from the request object of a selected request unit. The first request unit includes a second resource broker for receiving information on utilization of the first and second network interface cards from the first and second action units and is operable to select, in dependence upon the network interface card utilization information, one of the action units to which to send the execute instruction.

Conveniently, the protocol unit includes a protocol agent for communicating with a network management system to receive the management request and a protocol converter in communication with the protocol agent, the first resource broker, and the selected request unit. The protocol agent is operable to convert the received management request into a generic switch resource access format and dispatch the converted management request to the selected request unit in response to a dispatch instruction from the first resource broker.

Conveniently, the first action unit includes an action object, an action object factory in communication with the selected request unit, and a managed object in communication with the action object. The action object factory is operable to create the action object in response to a create action object instruction from the selected request unit, and the action object is operable to execute the received management request on the managed object.

Conveniently, the first request unit includes a request object server in communication with the protocol unit, a request object in communication with a selected action unit, and a resource model in communication with the first request object for storing information on attributes of the telecommunications switch. The request object server is operable to create the first request object in response to a create request object instruction from the protocol unit, and the request object is operable to instruct the selected action unit to create the action object in dependence upon the information stored in the resource model.

According to yet another aspect of the present invention there is provided a method of managing a managed object in a telecommunications switch in response to a management request, the telecommunications switch having a protocol unit and a plurality of request units and action units. The method includes the steps of:

a) selecting a request unit in dependence upon information on utilization of the request units;

b) creating a request object in the selected request unit in response to an instruction from the protocol unit;

c) selecting an action unit in dependence upon information on utilization of the action units;

d) creating an action object in the selected action unit in response to an instruction from the request unit; and e) executing, by the action object, the management request on the managed object.

According to still another aspect of the present invention there is provided a method of operating a management system for a telecommunications switch, the management system having a protocol unit and a plurality of request units and action units. The method includes the steps of:

a) receiving a management request from a request source;

b) selecting a request unit in dependence upon information on utilization of the request units;

c) creating a request object in the selected request unit in response to an instruction from the protocol unit;

d) selecting an action unit in dependence upon information on utilization of the action units;

e) creating an action object in the selected action unit in response to an instruction from the request unit; and f) executing, by the action object, the management request on a managed object of the telecommunications switch.

Conveniently, where the protocol unit includes a first resource broker the method further includes the step of updating the first resource broker with information on utilization of the selected request unit. Where the selected request unit includes a second resource broker, the method further includes the step of updating the second resource broker with information on utilization of the selected action unit.

Conveniently, the method further includes the step of sending a result of execution of the management request to the request source. Where the request source and management system use different message formats, the step of receiving the management request further comprises converting the format of the management request from a request source format to a management system format, and the step of sending a result further includes the step of converting the format of the result from the management system format to the request source format.

Other aspects of the invention include combinations and sub combinations of the features described above other than the combinations described above.

BRIEF DESCRIPTION OF THE DRAWINGS

The invention will be further understood from the following description of an embodiment of the invention with reference to the accompanying drawings, in which.

DETAILED DESCRIPTION

Figure 1:
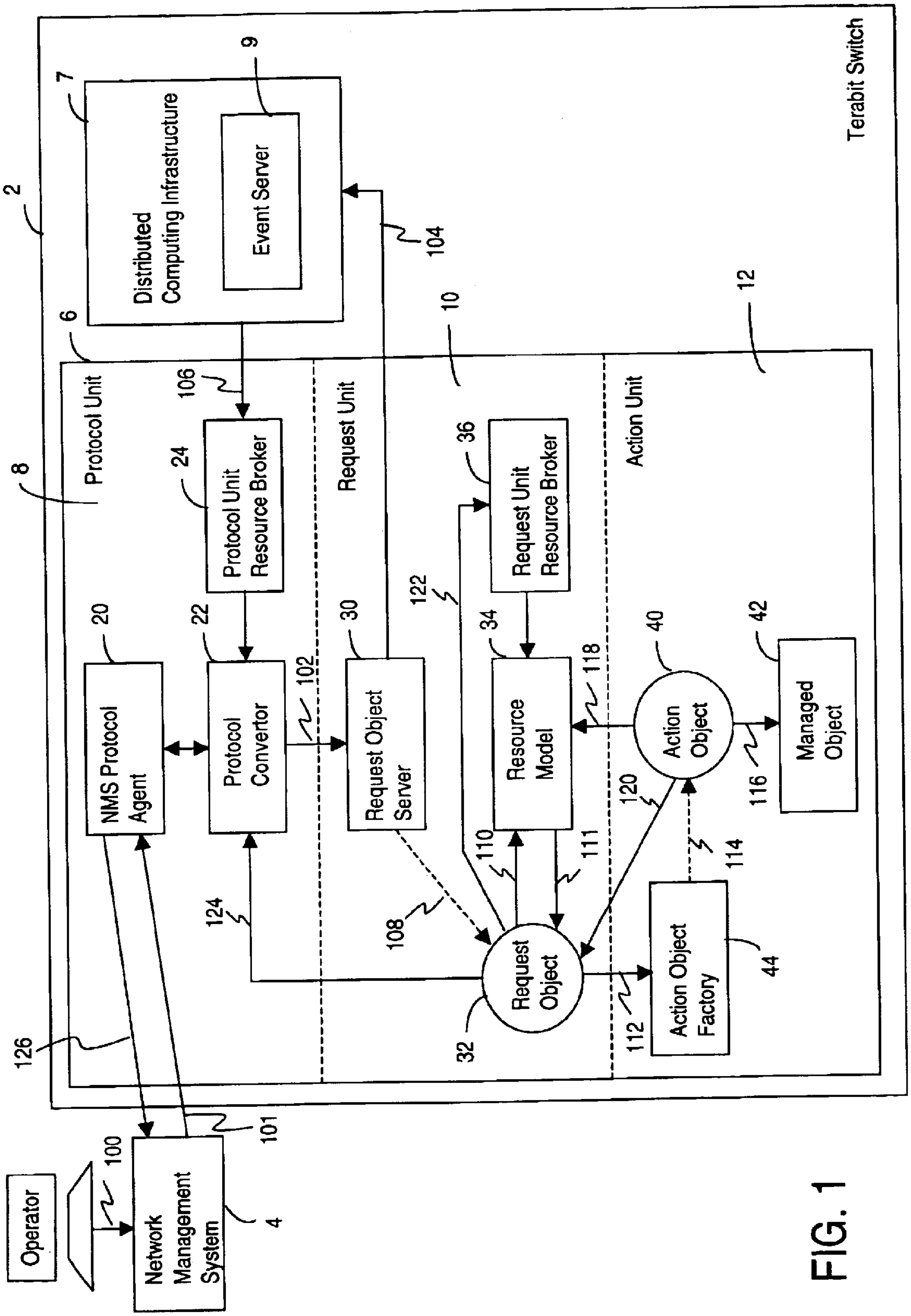
FIG. 1 is a block diagram of a management system in accordance with an embodiment of the invention.

FIG. 1 illustrates an embodiment of the management system of the present invention. In the figure, short-life software objects are depicted as circles and long-life software objects are depicted as boxes. Referring to FIG. 1, a terabit switch 2 receives network management traffic, in the form of OAM requests or more generally management requests, from a network management system 4 and forwards this traffic to a management system 6 residing in the terabit switch 2. The management system 6 is partitioned into three functional units: a protocol unit 8, a request unit 10 and an action unit 12. In a typical terabit switch 2 configuration there could be tens of instances of the protocol and request units implemented on dedicated processing or control cards, hereinafter referred to generally as processor cards, and hundreds of instances of the action units implemented on network interface and switching fabric cards, hereinafter referred to generally as network interface cards. A distributed computing infrastructure 7 is used by the management system 6 to execute multiple instances of each of the functional units 8, 10, 12 on available computing resources in the terabit switch 2. A high-performance Common Object Request Broker Architecture (CORBA)-like distributed object environment for intra-process and inter-process object communication such as Nortel's Real Time Asynchronous Communication Environment (RACE™) could be used to achieve the distributed computing infrastructure 7. Furthermore, an event server 9 of the distributed computing infrastructure 7 is used by the management system 6 to distribute computer processing unit (CPU) utilization information for effective and balanced computing resource utilization in the terabit switch 2.

As additional network interface and switching fabric cards are added to the switch 2, in order to increase the switching capacity of the switch to support growth in network traffic, the processing resources of these added cards provide additional processing capacity that can be used by the management system 6 to process a corresponding increase in network management traffic. Hence, the management system 6 is a scalable management system for processing network management traffic in a terabit switch. Furthermore, software restarts, re-compiles, and re-designs are not required by the management system 6 to support the increase in network management traffic. The management system 6 achieves more consistence response time for users under heavily loaded network management conditions, as compared to current monolithic OAM systems, by utilizing available processing resources of the network interface cards. The response time of current monolithic OAM systems tends to increase more quickly than embodiments of the present invention as network management traffic increases since, in current monolithic OAM systems, only one processor is available to run the management software.

Each instance of the protocol unit includes: a network management system (NMS) protocol agent 20 in communication with the network management system 4, a protocol converter 22 in communication with the NMS protocol agent 20 and selected instances of request units, and a protocol unit resource broker 24 in communication with the protocol converter 22 and the distributed computing infrastructure 7. Each instance of the request unit includes: a request object server 30 in communication with a particular instance of the protocol unit and the distributed computing infrastructure 7, a request object 32 created by the request object server 30 and in communication with the particular instance of the protocol unit, a resource model 34 in communication with the request object 32 and selected instances of the action unit, and a request unit resource broker 36 in communication with the request object 32 and the resource model 34. Each instance of action unit includes: an action object factory 44 in communication with the particular instance of request unit, an action object 40 created by the action object factory 44 and in communication with a particular instance of request unit, and a managed object 42 in communication with the action object 40.

Figure 2:
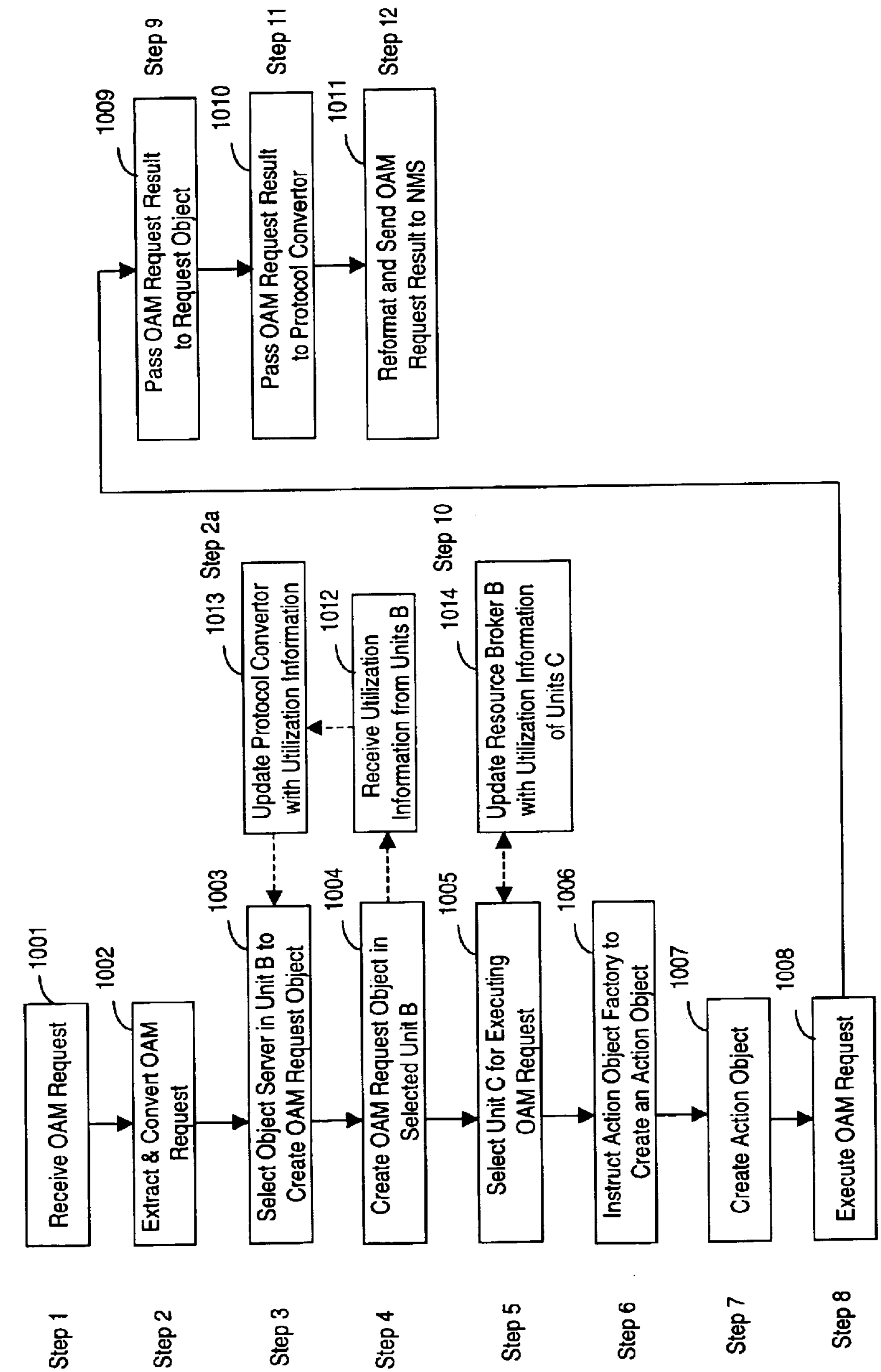
FIG. 2 is a flowchart depicting the operation of the management system of FIG. 1.

Referring to FIGS. 1 and 2 the operation of the management system 6 will now be described.

In step 1, box 1001 in FIG. 2, an operator or a VPN customer sends OAM requests 100, in the form of an NMS protocol message 101, from the network management system 4 to the management system 6. Then the NMS protocol agent 20 sends the message 101 to the protocol converter 22. The protocol message 101 can be in the form of any standard network management protocol message such as SNMP, HTTP or CLI messages used to manage the terabit switch. Hereinafter, the OAM requests are also referred to as management requests.

In step 2, box 1002 in FIG. 2, the protocol converter 22 receives the message 101, then tracts and converts the OAM requests 100 embedded within the NMS protocol message 101 into a generic switch resource access format (e.g., Pock's Sid) and OAM operations 102. The possible OAM operations are Get, Get Next, Set, Create, Delete, and Transaction. In step 2*a,* box 1012 and 1013, the protocol unit resource broker 24 receives periodic CPU utilization information 106 broadcast from the available request units 10 via the distributed computing infrastructure 7 and event server 9 by way of a request object server message 104.

In step 3, box 1003 in FIG. 2, the protocol unit resource broker 24 uses this information to select a particular request unit 10 that will facilitate load balancing among the request units and instructs the protocol converter 22 to dispatch the OAM requests 101 to the selected request unit 10.

In step 4, box 1004 in FIG. 2, the protocol convertor 22 instructs the request object server 30 in the selected request unit 10 to create, shown by a dashed arrow 108 in FIG. 1, the appropriate OAM request object(s) 32 for serving the OAM request(s) 100. The request object server 30 then creates the request object 32 in the selected request unit 10.

In step 5, box 1005 in FIG. 2, the newly created request object 32 consults the resource model 34 via a request object message 110 to determine whether it can obtain the desired information for the OAM requests 100 in the resource model 34. For provisional attributes of the switch 2 where the resource model 34 contains the information, the request object 32 returns the values and terminates itself (Step 10). For operational attributes of the switch 2, the resource model 34 instructs the request object 32 via a resource model message 111 the appropriate action unit 12 with which it should communicate for completing the OAM requests. The action unit 12 selection decision is based on the information contained in the request unit resource broker 36 with the following selection criteria:

- location of the managed object for serving the OAM requests 100
- the appropriate action unit 12 for serving the OAM requests 100 based on the CPU utilization of all action units obtained in step 10 over time In step of 6, box 1006 in FIG. 2, the request object 32 instructs, via a create message 112, the appropriate action unit's action object factory 44 to create an action object 40 to carry out the OAM requests.

In step 7, box 1007 in FIG. 2, the action object factory 44 creates, shown by a dashed arrow 114, the action object 40 for serving the OAM requests 100.

In step 8, box 1008 in FIG. 2, the action object 40 communicates with the managed object 42, via an action object message 116, and the resource model 34, via another action object message 118, in order to complete the OAM requests 100. Completion of the request 100 includes the following operations:

- carrying out the operation of the OAM request 100, which can be Get, GetNext, Set, Create, and Delete by communicating with the appropriate managed object
- executing the pre-condition and post-condition logic of the OAM request 100. For example, the pre-condition logic of an OAM Set request to turn the administration status of a port to DOWN status can be to verify whether there is any on-going traffic in any virtual circuits of the port. This may require the action object 40 to communicate with the resource model 34
- providing concurrency access to a managed object 42 so that when multiple OAM requests 100 are destined to the same managed object 42 at the same time, no OAM requests 100 are blocked
- providing a type-safe interface to the managed object 42 so that inconsistencies in software interfaces are caught during software development time instead of at runtime In step 9, box 1009 in FIG. 2, the action object 40 passes the operation result from the managed object and the current CPU utilization of the action unit 12 to the request object 32 via an update message 120. The action object 40 then terminates itself and returns its computing resources back to the management system 6.

In step 10, box 1014 in FIG. 2, the request object 32 updates the request unit resource broker 36, via an update message 122, about the CPU utilization of the action unit. Over time, request unit resource broker 36 has a clear picture of the current CPU utilization of all action units 12 of the terabit switch 2.

In step 11, box 110 in FIG. 2, the request object 32 returns the results 124 to the protocol convertor 22. The request object 32 then terminates itself and returns its computing resources back to the management system 6.

In step 12, box 1011 in FIG. 2, the NMS protocol agent 20 reformats the result for presentation using the user selected NMS protocol and returns the reformatted result 126 to the Network Management System 4.

As stated earlier, there can be tens of instances of both the protocol units 8 and the request units 10 and hundreds of instances of the action units 12 for a typical management system 6 configuration for a terabit switch 2.

Figure 3:
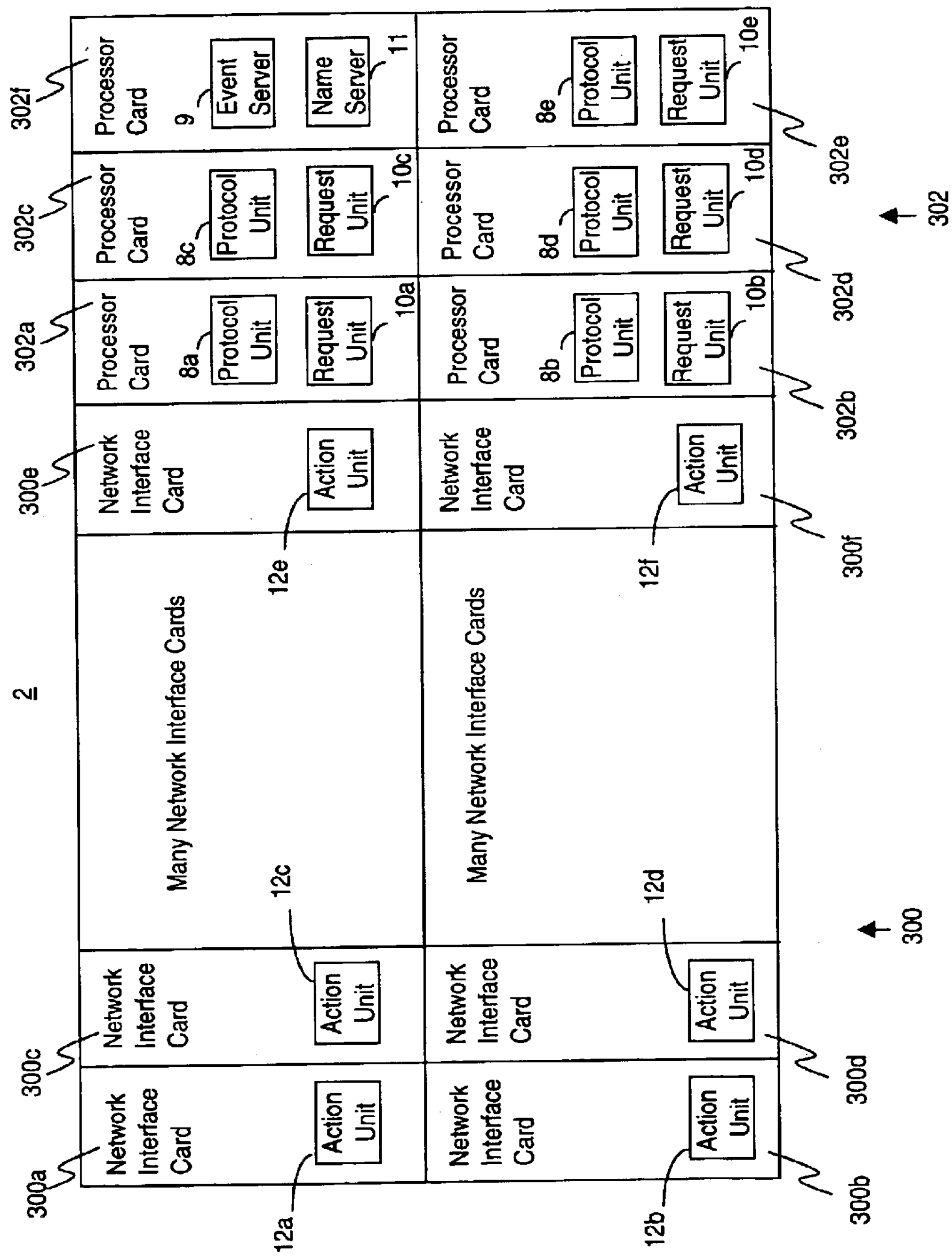
FIG. 3 is a plan view of part of a terabit switch showing the locations of components of the management system of FIG. 1.

FIG. 3 shows an example of a deployment scenario of the management system 6 in a terabit switch 2. Note that fail tolerance configuration (active and standby processing cards) of the terabit switch 2 is not shown in the figure. Instances of each functional unit of the management system 6 are shown as labeled boxes in network interface 300 and processor cards 302 as appropriate. The management system 6 includes many instances of the action units 12, six of which are shown as action units 12*a* to 12*f* in six network interface cards 300*a* to 300*f*. The management system 6 further includes several instances of the protocol units 8 and the request units 10, five of each are shown as protocol units 8*a* to 8*e* and requests units 10*a* to 10*e* in five processor cards 302*a* to 302*e*. The event server 9 and a name server 11 of the distributed computing infrastructure 7 are shown as residing on a sixth processor card 302*f*.

For further clarity, tables 1, 2, and 3 show the number of instances, life cycle, and run-time location of each of the software components of the management system 6.

TABLE 1

Instance, life cycle, and run-time locations for protocol units

| Component | Instance | Life cycle | Run-time Location |
|---|---|---|---|
| NMS protocol agent 20 | Multiple instances per NMS protocol supported by the switch 2 | Created when the switch 2 is started up. Connections between NMS stations such as CLI terminal, SNMP manager, and WEB browser to the NMS protocol agents 20 are hardwired in the sense that operators and customers are assigned with the corresponding network address (e.g., IP address) of the protocol unit. | Dedicated processing or control card 302 |
| Protocol converter 22 | One per NMS protocol agent 20 instance | Created with each NMS protocol agent 20 instance | Dedicated processing or control card 302 |
| Protocol unit resource broker 24 | One per NMS protocol agent 20 instance | Created with each NMS protocol agent 20 instance | Dedicated processing or control card 302 |

TABLE 2

Instance, life cycle, and run-time locations for request units

| Component | Instance | Life cycle | Run-time Location |
|---|---|---|---|
| Request object server 30 | Multiple per switch 2 | Created when the switch 2 is started up Each resource object server 30 registers to the name server 11 so that in case of a software failure, a protocol unit 6 can consult the name server 11 to find the available request units 10 for OAM request 100 dispatch | Dedicated processing or control card 302 |
| Request object 32 | One per each network interface and switching fabric cards 300 | Short life active object Terminates when the OEM request 100 has been completed | Dedicated processing or control card 302 |
| Resource model 34 | One per each request object server 30 instance | Created when the request object server 30 instance is started up | Dedicated processing or control card 302 |

TABLE 3

Instance, life cycle, and run-time locations for action units

| Component | Instance | Life cycle | Run-time Location |
|---|---|---|---|
| Action object factory 44 | One per each network interface and switch fabric cards 300 | Created when the network interface can switch fabric cards 300 are initialized | Network interface and switch fabric cards 300 |
| Action object 40 | Usually one per each request object 32. For transactional type request objects 32, many action objects 40 are associated with the transactional type request object 32 | Short life active object Terminates when the OAM request 100 has been completed. | Network interface and switch fabric cards 300 |

TABLE 3-continued

| Instance, life cycle, and run-time locations for action units | | | |
|---|---|---|---|
| Component | Instance | Life cycle | Run-time Location |
| Managed object 42 | Multiple per network interface and switch fabric cards 300 | Created when software entities of the switch 2 are initialized | Network interface and switch fabric cards 300 |

Numerous alterations, variations and adaptations to the embodiments of the invention described above are possible within the scope of the invention, which is defined by the claims.

What is claimed is:

1. A management system configured to perform operation, administration, and maintenance (OAM) functions for a telecommunications switch, said telecommunications switch having a first network interface card, a first processor card, and a second processor card, the management system comprising:

a protocol unit residing on the first processor card for receiving a management request relating to at least one of the OAM functions;

a first request unit residing on the first processor card for creating a first request object in response to the received management request;

a second request unit residing on the second processor card for creating a second request object in response to the received management request, and a first action unit residing on the first network interface card for executing the received management request in response to an instruction from the first request object;

and wherein, the protocol unit includes a first resource broker for receiving utilization information on the first and second processor cards from the first and second request units and is operable to select, in dependence upon the utilization information, one of the request units to which to send the received management request.

2. The management system of claim 1, wherein the telecommunications switch includes a Management Information Base (MIB) containing MIB variables that may be accessed via the management system, and wherein the OAM function of the management request relates to accessing at least one of the MIB variables.

3. The management system of claim 2, wherein accessing the at least one MIB variable comprises executing at least one of a Get, Get Next, Set, Create, Delete, and Transaction operation.

4. The management system of claim 3, wherein accessing the at least one of the MIB variables comprises obtaining a value of the at least one of the MIB variables.

5. The management system of claim 3, wherein accessing the at least one of the MIB variables comprises changing a value of the at least one of the MIB variables.

6. The network switch of claim 1, wherein the first network interface card is configured to handle network traffic; and wherein the first processor card is configured to influence operation of the first network interface card.

7. A management system configured to perform operation, administration, and maintenance (OAM) functions for a telecommunications switch, said telecommunications switch having a first network interface card, a second network interface card, and a first processor card, the management system comprising:

a protocol unit residing on the first processor card for receiving a management request relating to at least one of the OAM functions;

a first request unit residing on the first processor card for creating a first request object in response to the received management request;

a first action unit residing on the first network interface card for executing the received management request in response to an instruction from the first request object; and a second action unit residing on the second network interface card for executing the received management request in response to an instruction from the first request object, and wherein, the first request unit includes a second resource broker for receiving utilization information on the first and second network interface cards from the first and second action units and is operable to select, in dependence upon the utilization information, one of the action units to which to send the instruction.

8. A management system configured to perform operation, administration, and maintenance (OAM) functions for a telecommunications switch, said telecommunications switch having a distributed computing infrastructure and a plurality of network interface cards and processor cards, the management system comprising:

a protocol unit residing on a first processor card for receiving a management request relating to at least one of the OAM functions;

a first request unit residing on a second processor card for creating a first request object in response to the received management request; and a first action unit residing on a first network interface card for executing the received management request in response to an execute instruction from the first request object.

9. The management system of claim 8, further comprising:

a second request unit residing on a third processor card for creating a second request object in response to the received management request, and wherein, the protocol unit includes a first resource broker for receiving information on utilization of the second and third processor cards from the distributed computing infrastructure and is operable to select, in dependence upon the processor card utilization information, one of the request units to which to send the received management request.

10. The management system of claim 9, further comprising:

a second action unit residing on a second network interface card for executing the received management request in response to an execute instruction from the request object of a selected request unit, and wherein, the first request unit includes a second resource broker for receiving information on utilization of the first and second network interface cards from the first and second action units and is operable to select, in dependence upon the network interface card utilization information, one of the action units to which to send the execute instruction.

11. The management system of claim 10, wherein the protocol unit comprises:

a protocol agent for communicating with a network management system to receive the management request; and a protocol converter in communication with the protocol agent, the first resource broker, and the selected request unit; and being operable to convert the received management request into a generic switch resource access format and dispatch the converted management request to the selected request unit in response to a dispatch instruction from the first resource broker.

12. The management system of claim 10, wherein the first action unit comprises:

an action object;

an action object factory in communication with the selected request unit; and a managed object in communication with the action object, wherein, the action object factory is operable to create the action object in response to a create action object instruction from the selected request unit; and the action object is operable to execute the received management request on the managed object.

13. The management system of claim 10, wherein the first request unit comprises:

a request object server in communication with the protocol unit;

a first request object in communication with a selected action unit; and a resource model in communication with the first request object for storing information on attributes of the telecommunications switch, wherein, the request object server is operable to create the first request object in response to a create request object instruction from the protocol unit; and the request object is operable to instruct the selected action unit to create the action object in dependence upon the information stored in the resource model.

14. A method of managing a managed object in a telecommunications switch in response to a management request relating to at least one of an operation, administration, and maintenance (OAM) function, the telecommunications switch having a protocol unit and a plurality of request units and action units, the method comprising the steps of:

a) selecting a request unit in dependence upon information on utilization of the request units;

b) creating a request object in the selected request unit in response to an instruction from the protocol unit;

C) selecting an action unit in dependence upon information on utilization of the action units;

d) creating an action object in the selected action unit in response to an instruction from the request unit; and e) executing, by the action object, the management request relating to the at least one OAM function on the managed object.

15. A method of operating a management system for a telecommunications switch, the management system having a protocol unit and a plurality of request units and action units, the method comprising the steps of:

a) receiving a management request relating to at least one of an operation, administration, and maintenance (OAM) function from a request source;

b) selecting a request unit in dependence upon information on utilization of the request units;

C) creating a request object in the selected request unit in response to an instruction from the protocol unit;

d) selecting an action unit in dependence upon information on utilization of the action units;

e) creating an action object in the selected action unit in response to an instruction from the request unit; and f) executing, by the action object, the management request relating to the at least one OAM function on a managed object of the telecommunications switch.

16. The method of claim 15, wherein the protocol unit includes a first resource broker and the method further includes the step of updating the first resource broker with information on utilization of the selected request unit.

17. The method of claim 16, wherein the selected request unit includes a second resource broker and the method further includes the step of updating the second resource broker with information on utilization of the selected action unit.

18. The method of claim 17, further including the step of sending a result of execution of the management request to the request source.

19. The method of claim 18, wherein the step of receiving the management request further comprises converting the format of the management request from a request source format to a management system format, and the step of sending a result further comprises the step of converting the format of the result from the management system format to the request source format.

* * * * *